United States Patent
Pontis

[11] 3,778,738
[45] Dec. 11, 1973

[54] NUTATABLE SHAFT AND A ROTATABLE MEMBER WITH A MAGNETIC COUPLING THEREBETWEEN

[76] Inventor: William Grant Pontis, 303 Wendy Ln., Waverly, Ohio 45690

[22] Filed: Oct. 25, 1972

[21] Appl. No.: 300,845

[52] U.S. Cl. .................................. 335/306, 73/260
[51] Int. Cl. ............................................... H01f 7/02
[58] Field of Search ...................... 73/260; 335/207, 335/306

[56] References Cited
FOREIGN PATENTS OR APPLICATIONS
688,402  3/1953  Great Britain ..................... 335/306

*Primary Examiner*—George Harris
*Attorney*—John W. Melville et al.

[57] ABSTRACT

A shaft mounted for nutation, a rotatable member rotatable about an axis passing through the apex point of nutation of the shaft and a magnetic coupling between the shaft and the rotatable member. A driven magnet is provided in association with the shaft and is capable of nutation therewith. A driving magnet is mounted on a primary rotatable driving member, and is rotatable therewith. Means are provided separating the driven and driving magnets. The driving and driven magnets are so oriented with respect to each other as to form a non-contacting magnetic coupling therebetween whereby rotation of the primary rotatable driving member and the driving magnet mounted thereon will result in nutation of the shaft and the driven magnet in association therewith. The shaft and its associated driven magnet may be located in a different medium or environment from the primary rotatable driving member and its driving magnet. Furthermore, the driving magnet may be protected from the medium or environment surrounding the primary rotatable driving member. Means may also be provided to control the orbit and axial rotation of the nutatable shaft.

17 Claims, 5 Drawing Figures

3,778,738

NUTATABLE SHAFT AND A ROTATABLE MEMBER WITH A MAGNETIC COUPLING THEREBETWEEN

BACKGROUND OF THE INVENTION

1. Field of the Invention

The invention relates to a rotatable member and a nutatable shaft and a coupling means therebetween, and more particularly to a non-contacting magnetic coupling enabling the rotating member and the nutatable shaft to be located in different environments or mediums.

2. Description of the Prior Art

The structure of the present invention may have unlimited applications and is useful in any situation where it is desired to transmit the rotation of a given member to nutational movement of a shaft or the like. The primary rotatable driving member may derive its motion from any source, including movement of gases, liquids or dry particles, an electric or other motor, or any other motion producing arrangement. The shaft, in turn, may be used to perform any desired type of work. The structure of the present invention is particularly applicable to situations wherein it is desired to maintain the nutatable shaft in a sealed environment, or in an environment different from that which surrounds the primary rotatable driving member.

While not intended to be so limited, for a clearer understanding of the present invention it will be generally described with respect to its application to a fluid measuring meter such as a meter for measuring gases, liquids or the like. The fluid meters taught in U.S. letters Pat. Nos. 3,492,867 and 3,492,868 are exemplary of such meters utilizing nutating shaft means between a rotating fluid measuring means and the input shaft of a conventional fluid register. In such applications, it is frequently desirable to hermetically seal the register to protect it from the ill effects of moisture and the like and to render its enclosure fog-free for easy reading. At the same time, the rotating fluid measuring means is in contact with the fluid being measured.

While the nutating shaft constitutes an excellent and simple means by which the rotating fluid measuring means may drive the meter register, diaphragm or other means must be provided in association with the nutating shaft to separate the chamber containing register from the remainder of the meter. The sealing of the register chamber from the remainder of the meter is a difficult and expensive task, and the resilient diaphragm means or other sealing means used is subject to wear and deterioration.

The present invention provides a primary rotatable driving member and a nutating shaft with a non-contacting magnetic coupling therebetween. As a consequence, permanent, non-resilient sealing means may be interposed between the primary rotatable driving member and the nutating shaft, so that both of these elements may be located in different environments. In the case of a fluid meter, for example, the nutating shaft may be wholly located within the hermetically sealed environment of the register and permanently sealed from the environment surrounding the primary rotatable driving member.

The present invention involves the provision of a driven magnet in association with the nutatable shaft and a driving magnet in association with the primary rotatable driving member. The instant magnetic coupling has the additional advantage that the driving magnet may also be protected from the environment surrounding the primary rotatable driving member. Furthermore, the structure of the present invention may include means for controlling the orbit of the nutating shaft and the axial rotation of the nutating shaft.

SUMMARY OF THE INVENTION

In accordance with the invention a shaft is mounted for nutation and a driven magnet is provided in association therewith. The shaft may be utilized to perform any appropriate work. A primary rotatable driving member is also provided, being rotatable about an axis passing through the apex point of nutation of the shaft. The primary rotatable driving member has a driving magnet mounted thereon. Means are present separating the driving and driven magnets, which magnets are so oriented with respect to each other and so spaced from each other as to form a non-contacting magnetic coupling therebetween. As a result of this magnetic coupling, rotation of the primary rotatable driving member and its driving magnet will result in nutation of the shaft and its associated driven magnet.

Since the driving and driven magnets are intended to be non-contacting, the nutating shaft and its associated driven magnet may be located in an environment different from that which surrounds the primary rotatable driving member. As will be described hereinafter, the driving magnet may also be protected from the environment surrounding the primary rotatable driving member.

A tracking spool may be mounted on the means separating the driving and driven magnets. The tracking spool should be so positioned as to lie centrally of the orbit described by the adjacent portion of the nutating shaft and its driven magnet. A circular control ring simultaneously engages the tracking spool and the nutating shaft or its associated driven magnet. The control ring will determine the orbit of the nutating shaft. As will be described hereinafter, the provision of meshing teeth on the inside surface of the control ring, the tracking spool and that portion of the nutating shaft or its associated driven magnet engaged by the control ring will enable desired control of the axial rotation of the shaft.

DESCRIPTION OF THE PREFERRED EMBODIMENTS

Figure 1:
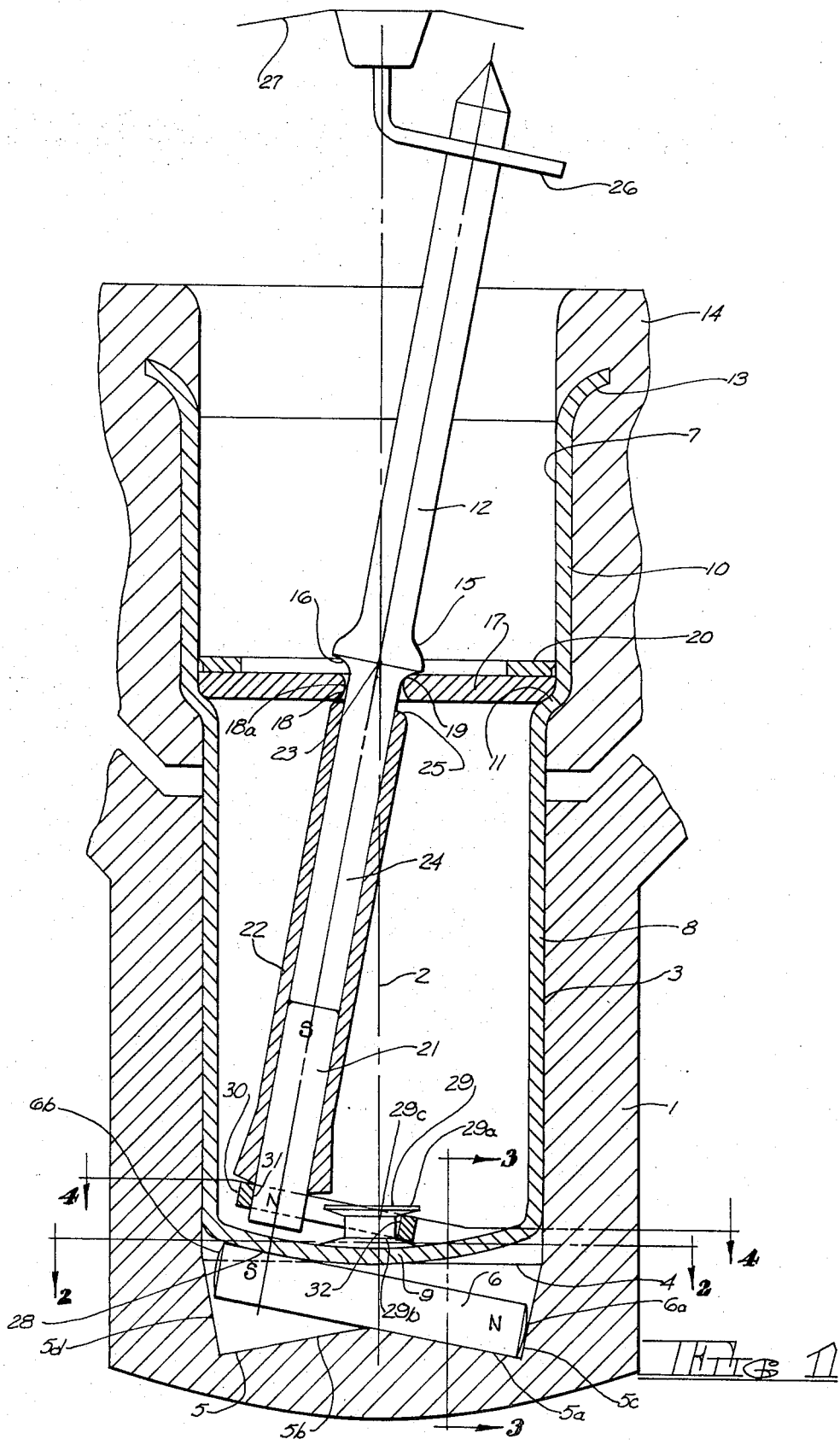
FIG. 1 is a fragmentary cross sectional elevational view illustrating the nutating shaft, the primary rotatable driving member and the magnetic coupling therebetween.

Reference is first made to FIG. 1 wherein a primary rotatable driving member is shown at 1. The primary rotatable driving member is adapted to rotate about the vertical axis shown in broken lines at 2. The nature of the primary rotatable driving member 1 and the means for rotating it do not constitute a limitation on the present invention. For purpose of an exemplary showing, however, the primary rotatable driving member 1 may be considered as being operatively connected to the rotating fluid measuring means of a fluid meter (not shown)

Figure 2:
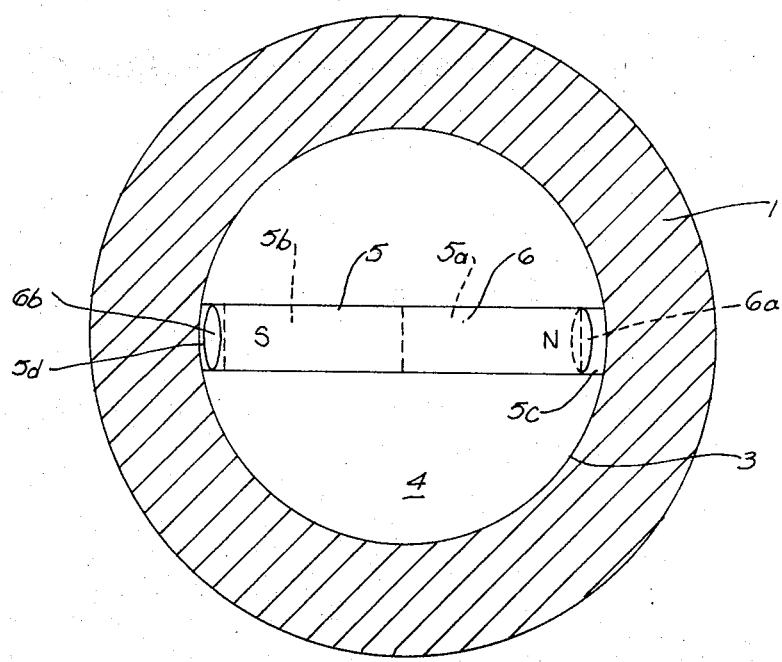
FIG. 2 is a cross sectional view taken along the section line 2—2 of FIG. 1.
Figure 3:
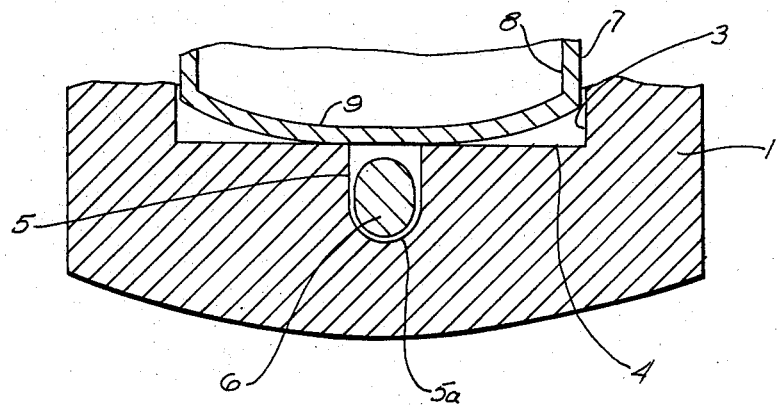
FIG. 3 is a fragmentary cross sectional view taken along the section line 3—3 of FIG. 1.

The primary rotatable driving member 1 has a central cylindrical bore 3 terminating in a flat bottom surface 4. Reference is also made to FIGS. 2 and 3, wherein like parts have been given like index numerals.

The bottom surface 4 of the bore 3 has a transverse, diametrical depression or slot 5 therein. The slot 5 has an inverted V-shaped configuration forming surfaces 5a and 5b. The ends 5c and 5d of the slot 5 slope downwardly and inwardly so as to be substantially normal to the adjacent ones of the surfaces 5a and 5b, respectively.

The slot 5 is adapted to receive an elongated, cylindrical driving magnet 6. The length and diameter of the driving magnet 6 and the length and width of the slot 5 are such that the magnet is freely rotatable about its own long axis within the slot. The configuration of the bottom of slot 5 (i.e. surfaces 5a and 5b) is such as to minimize friction with respect to the axial rotation of the driving magnet 6. Furthermore, the ends 6a and 6b of the magnet may be slightly rounded or convex. Thus, the bearing between magnet end 6a and the slot end wall 5c is minimized. The primary rotatable driving member 1 is made of non-magnetic material and may, for example, be molded of plastic or the like.

In FIG. 1 a container is shown at 7. The container is made of any non-magnetic material such as stainless steel. The container has a lower cylindrical portion 8 terminating in a gently rounded bottom 9. The cylindrical portion 8 is so sized that the member 1 is rotatable thereabout. It will be understood that the axis of rotation 2 of the primary rotatable driving member 1 also constitutes the longitudinal axis of container 7. The container has an upper cylindrical portion 10 of slightly larger diameter, forming a shoulder 11 between portions 8 and 10.

The container 7 contains nutatable shaft 12 and may constitute a part of any appropriate structure housing the nutatable shaft. For purposes of an exemplary showing, the container 7 is shown as having a flared upper portion 13 embedded in the material of a fluid meter housing 14. Again, the fluid meter housing 14 is preferably made of non-magnetic material and may, for example, be molded of plastic or the like.

The nutatable shaft 12 comprises an elongated cylindrical member having an annular apex bearing hub 15 at a point between its ends. The apex bearing hub 15 has on its underside an annular, transversely curved bearing surface 16.

Mounted on the shoulder 11 of the container 7 there is a disc-like element 17 having a central perforation 18. It will be noted that the surface 18a forming the perforation 18 is transversely curved and substantially matches the transversely curved annular bearing surface 16 on the underside of hub 15. This is clearly illustrated at the point of contact between the annular hub bearing surface 16 and the perforation surface 18a, which point of contact is shown at 19. The disc-like structure 17 constitutes a stationary bearing raceway having the bearing surface 18a and is held in position on the container shoulder 11 by a retaining ring 20 which bears upon the upper surface of raceway 17 and frictionally engages the interior surface of portion 10 of the container 7.

It will be understood that as shaft 12 nutates, its bearing surface 16 will have a rolling bearing contact with the raceway bearing surface 18a. The point of contact 19 will therefore describe a circle on both of these bearing surfaces, which circles have the same diameter.

As indicated above, the nutatable shaft 12 has in association therewith a driven magnet. The magnet may be located in association with the shaft in any suitable way and (where conditions permit — depending upon the use to which the nutatable shaft is put) the nutatable shaft itself may constitute the driven magnet.

The purposes of an exemplary showing, an elongated cylindrical driven magnet is illustrated at 21 in FIG. 1. The magnet 21 may be the same diameter as the nutatable shaft 12 and is in coaxial, abutting relationship with the bottom end of the shaft 12. Again, the magnet 21 may be held in place as shown by any suitable means. One such means is illustrated in FIG. 1 and constitutes an elongated, cylindrical sleeve 22 which is mounted on both the shaft 12 and the driven magnet 21. The sleeve is made of non-magnetic material and may be affixed to the shaft 12 and driven magnet 21 by gluing or any other suitable means. It may, for example, be formed of resilient plastic material and simply frictionally engage the shaft 12 and driven magnet 21.

It will be noted that the hub 15 is located just above the apex axis point of nutation 23 located at the intersection of the axis of rotation 2 and the long axis 24 of the shaft 12. The interaction of bearing surfaces 16 and 18a are such that the stationary raceway 17 supports the shaft 12. The shaft 12 and driven magnet 21 are so sized that the lowermost end of the driven magnet extends to a position just short of the inside surface of the bottom 9 of container 7. To complete the shaft structure, the coupling sleeve 22 may have at its upper end a thrust shoulder 25 cooperating with the raceway 17 to prevent axial displacement of the shaft assembly.

As indicated above, the nutatable shaft 12 may perform any desired work. Since, for purposes of an exemplary embodiment, the structure of FIG. 1 has been described as a part of a fluid meter, the uppermost end of shaft 12 is illustrated as being in contact with the input shaft 26 of a conventional register, diagrammatically illustrated at 27.

The operation of the structure thus far taught may be described as follows. The primary rotatable driving member 1 is caused to rotate about the axis 2 and the cylindrical portion of container 7. Depending upon the nature of primary rotatable driving member 1 any suitable prime mover may cause its rotation. In the exemplary embodiment the primary rotatable driving member 1 is described as being operatively connected to the rotating fluid measuring means, constituting its source of rotation. The driving magnet 6 not only rotates about the axis 2, but also about its own long axis. This results in a rolling bearing engagement (indicated at 28) between the magnet 6 and the exterior surface of the bottom 9 of container 7 throughout all rotation of the member 1. This rolling bearing between the driving magnet 6 and the container bottom 9 minimizes friction therebetween.

While the driving magnet 6 and driven magnet 21 are separated by the container bottom 9, they are nevertheless in close proximity. As a consequence, a non-contacting magnetic coupling is formed therebetween. As a result, rotation of member 1 and the driving magnet 6 will result in nutation of the driven magnet 21 and shaft 12 about the point of nutation 23. The shaft 12, in turn, performs its work (i.e., in the embodiment described driving the input shaft 26 of a conventional register). The engagement between the shaft 12 and the element 26 it drives may be mechanical, magnetic or any other suitable engagement. It will be evident from FIG. 1 that the shaft 12 and its associated driven magnet 21 may be located in a wholly different medium or environment from that surrounding the primary rotatable driving member 1. To illustrate this, it is conventional to surround the register 27 with a transparent dome (not shown) or similar means sealed to the meter housing 14. To protect the register from moisture and to prevent fogging of the transparent dome, it is conventional to hermetically seal the dome within which the register is located. In the embodiment of FIG. 1, the container 7 (communicating with the register dome) would likewise be hermetically sealed, thus the shaft 12 and driven magnet 21 would reside in a hermetically sealed environment.

The primary rotatable driving member 1, on the other hand, having for purposes of exemplary illustration been described as being operatively connected to a rotating fluid measuring means, would likely be exposed to the fluid (gas or liquid) being measured. Thus, the nutating shaft 12 and the member 1 reside in different environments without the necessity of elaborate seals, resilient diaphragms and the like.

At the same time it will be evident from FIG. 1 that the driving magnet 6 is also protected from the medium or environment surrounding primary driving member 1. As a consequence, the driving magnet need not be exposed to a corrosive medium or foreign material therein and is not subject to the accumumulation of magnetic foreign material entrained in the medium.

It would be within the scope of the invention to fill container 7 with a desired liquid or gas and hermetically seal it. SImilarly, the bottom portion of the cylindrical bore 3 of member 1 and the slot 5 therein could be filled with a desired liquid or gas and hermetically sealed.

There are many instances and applications wherein it is desirable to control the orbit of the nutating shaft 12. For example, the shaft 12 may be nutated at such a speed that the resulting centrifugal force builds to the point where orbit control is required. Furthermore, the work being performed by the shaft 12 may, itself, require orbit control. The structure of the present invention lends itself well to the provision of orbit controlling means and such means are illustrated in FIGS. 1, 4 and 5.

The orbit controlling means comprises a stationary tracking spool 29 and a control ring 30. The stationary tracking spool 29 comprises a circular element having upper and lower shoulders 29a and 29b with a spheroidal bearing surface 29c therebetween. The spool 29 is made of non-magnetic material and is affixed to the inside surface of the bottom 9 of container 7. The axis of spool 29 and the axis 2 are coaxial.

The control ring 30 has a smooth, circular inner surface having a rolling bearing contact with magnet 21 as at 31 and a rolling bearing contact with the spheroidal surface 29 of the tracking spool, as at 32. As the shaft 12 and its associated driven magnet 21 nutate, the control ring 30 will remain in contact with the magnet and the spool, controlling and limiting the orbit of the shaft and its driven magnet. Since the bearing between the control ring and magnet 21 and the bearing between the control ring and spool 29 are rolling bearings, friction therebetween will be minimized. The spool shoulders 29a and 29b will maintain the ring in proper position with respect to the spool. The control ring 30 is made of non-magnetic material and, except for its own weight, there is substantially no operational tendency for the ring 30 to drift up or down on the end of the driven magnet 21. The magnetic coupling between the driven magnet 21 and the driving magnet 6 is such that it will tend to retain the driven magnet 21 in such position as to hold the control ring 30 in snug bearing contact with the magnet 21 and the spool 29. There will be substantially no play enabling the ring to become shifted or dislodged. It will be remembered that the bearing hub 15 and sleeve shoulder 25 will cooperate to prevent axial shifting of the shaft 12 and magnet 21. By properly sizing the inside diameter of control ring 30, a desired, predetermined orbit for shaft 12 can be achieved. It will be noted that preferably the diameter of magnet 21 and the diameter of the spheroidal surface 29c of spool 29 are the same.

Figure 4:
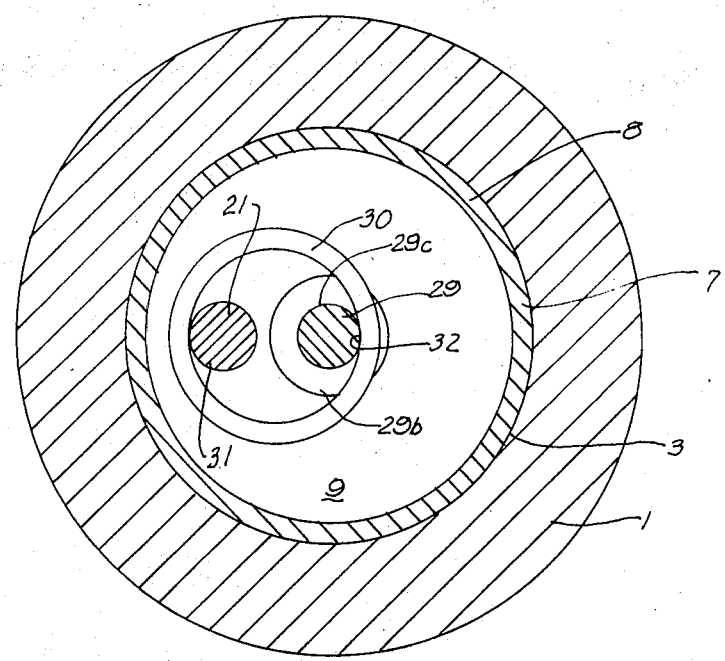
FIG. 4 is a cross sectional view taken along the section line 4—4 of FIG. 1.
Figure 5:
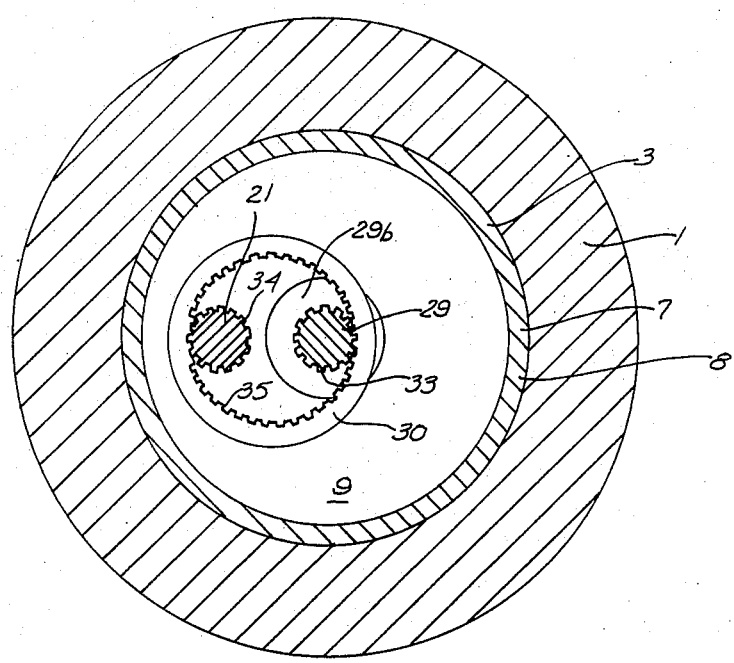
FIG. 5 is a cross sectional view, similar to FIG. 4, illustrating a modified form of tracking spool and control ring.

FIG. 5 is similar to FIG. 4 and illustrates a modification of the driven magnet, the spool and the control ring whereby not only the orbit of shaft 12 may be controlled but also the rotation of shaft 12 about its own long axis. In FIG. 5 like parts have again been given like index numerals.

In this embodiment, the stationary tracking spool 29 is provided with a bearing surface 33 having gear teeth. In similar fashion, the bottom end of the driven magnet 21 is provided with gear teeth as at 34. To complete the structure, the control ring 30 has gear teeth 35 formed on its inner surface. The ring gear teeth 35 mesh with the teeth 33 on spool 29 and the teeth 34 on driven magnet 21. The spool 29 acts as a sun gear, while the driven magnet 21 acts as a planetary gear. Again, it will be noted that the toothed surface 33 of spool 29 and the toothed surface 34 of driven magnet 21 may have the same pitch diameter and same number of teeth.

If the spool teeth 33 and the driven magnet teeth 34 are equal in number, the nutating shaft 12 will not rotate about its axis as it nutates. The same structure may be used, however, to provide a timed and controlled rotation of the shaft 12 during nutation. This is accomplished by varying the number of teeth 33 and 34. Thus, when the number of teeth 34 is greater than the number of teeth 33, the axial rotation of shaft 12 will lag in uniform increments during the course of shaft nutation. Conversely, when the number of teeth 34 is less than the number of teeth 33, axial rotation of the shaft 12 will lead in uniform increments during the course of shaft nutation. In this way, the spool 29 and control ring 30 can be employed not only to control the orbit of shaft 12, but also its axial rotation.

Modifications may be made in the invention without departing from the spirit of it.

The embodiments of the invention in which an exclusive property or privilege is claimed are defined as follows:

1. An elongated shaft having upper and lower ends and being mounted for nutation about an apex point of nutation located at a position between said upper and lower shaft ends, a rotatable member having a vertical axis of rotation passing through said apex point of nutation, a driven magnet in association with said shaft, a driving magnet mounted on said rotatable member and being rotatable therewith, said driving and driven magnets being in spaced relationship and so oriented with respect to each other as to form a non-contacting magnetic coupling therebetween, whereby rotation of said rotatable member and said driving magnet thereon will result in nutation of said shaft and said driven magnet in association therewith.

2. The structure claimed in claim 1 including means separating said driving and driven magnets, said shaft and said associated driving magnet being located in a first environment, said rotatable member being surrounded by a second environment different from said first environment.

3. The sturcture claimed in claim 1 including a container-like structure having a cylindrical lower portion with a closed bottom, said shaft and said associated driven magnet being mounted for nutation within said container, said rotatable member bieng mounted on said cylindrical portion of said container for rotation thereabout.

4. The structure claimed in claim 1 including means to control the orbit of said nutatable shaft.

5. The structure claimed in claim 1 wherein said shaft includes said driven magnet.

6. The structure claimed in claim 2 including means whereby said driving magnet is isolated from said first and second environments.

7. The structure claimed in claim 2 wherein said first environment is a hermetically sealed environment.

8. The structure claimed in claim 2 wherein said driven magnet is a cylindrical member with one of its ends affixed to said lower end of said shaft, said driven magnet and said shaft being coaxial, a circular spool mounted on said separating means with its axis coaxial with said axis of rotation, said spool having an annular bearing surface thereon, a circular ring-like structure, the inside surface of said ring-like structure engaging said driven magnet and said spool bearing surface at diametrically opposed positions on said inside surface whereby to control the orbit of said shaft during nutation thereof.

9. The structure claimed in claim 3, wherein said rotatable member has a central cylindrical bore terminating in a bottom surface, said lower cylindrical portion of said container being just nicely received within said bore with said container bottom adjacent said bore bottom, said driving magnet being mounted at said bore bottom.

10. The structure claimed in claim 3 wherein said container contains a first environment, said rotatable member being surrounded by a second environment, said first and second environments being dissimilar.

11. The structure claimed in claim 8 wherein said inside surface of said ring is provided with gear teeth, said driven magnet having peripheral gear teeth and said annular spool bearing surface having gear teeth, said ring, magnet and spool gear teeth being in meshing relationship and so related with respect to each other in number as to control axial rotation of said shaft during nutation thereof.

12. The structure claimed in claim 9 wherein said bore bottom has a transverse diametrical slot therein, said slot having ends and a bottom having two surfaces forming an inverted V-shape, said driving magnet comprising an elongated cylindrical member supported on one of said bottom surfaces of said slot with one end of said magnet abutting that end of said slot adjacent said supporting surface, said driving magnet being axially rotatable in said slot, said container bottom being gently rounded, the peripheral surface of said driving magnet adjacent the end thereof opposite said end abutting said slot end being in rolling contact with said container bottom when said rotatable member is rotated.

13. The structure claimed in claim 11 wherein the number of said driven magnet gear teeth and the number of said spool gear teeth are equal whereby to prevent axial rotation of said shaft during nutation thereof.

14. The structure claimed in claim 12 wherein said container contains a first environment, said rotatable member being surrounded by a second environment, said first and second environments being dissimilar.

15. The structure claimed in claim 12 wherein said driven magnet is a cylindrical member with one of its ends fixed to said lower end of said shaft, said driven magnet and said shaft being coaxial, a circular spool being mounted within said lower portion of said chamber on said bottom thereof with its axis coaxial with said axis of rotation, said spool having an annular bearing surface thereon, said bearing surface and said driven magnet having the same diameter, a circular ring-like structure, the inside surface of said ring-like structure engaging said driven magnet and said spool bearing surface at diametrically opposed positions on said inside surface whereby to control the orbit of said shaft during nutation thereof.

16. The structure claimed in claim 15 wherein said inside surface of said ring is provided with gear teeth, said driven magnet having peripheral gear teeth and said annular spool bearing surface having gear teeth, said ring, magnet and spool gear teeth being in meshing relationship and so related with respect to each other in number as to control axial rotation of said shaft during nutation thereof.

17. The structure claimed in claim 16 wherein said container contains a first environment, said rotatable member being surrounded by a second environment, said first and second environments being dissimilar.

* * * * *